July 11, 1933.  P. E. HAWKINSON  1,917,261
METHOD OF RETREADING TIRE CASINGS
Filed May 14, 1931   3 Sheets-Sheet 3
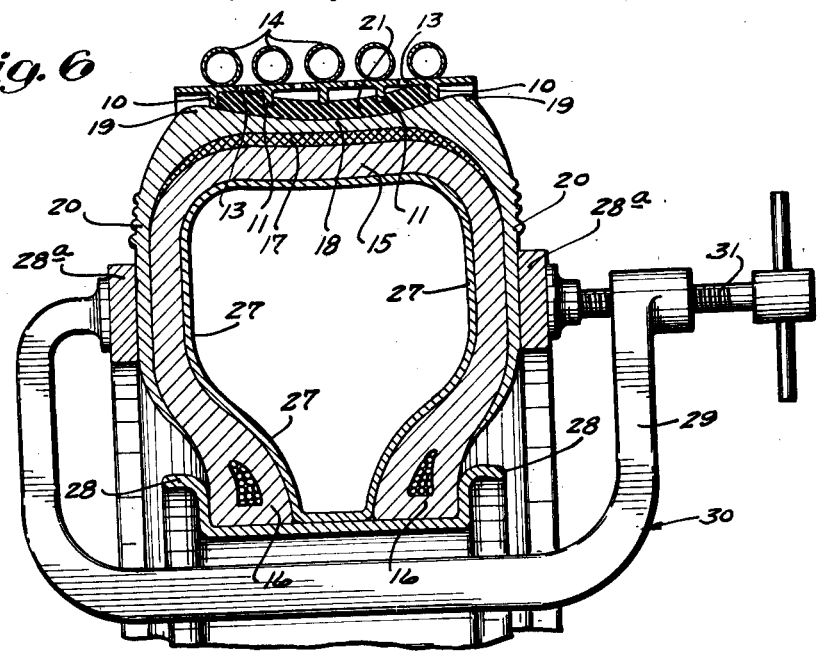
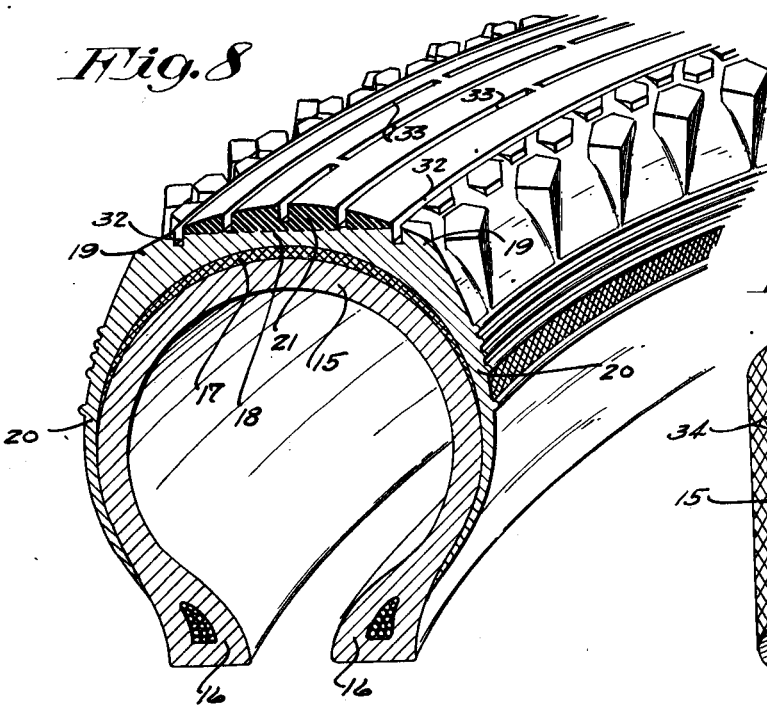
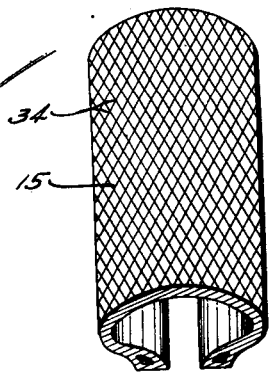
Inventor
Paul E. Hawkinson
By his Attorneys
Merchant & Kilgal Patented July 11, 1933

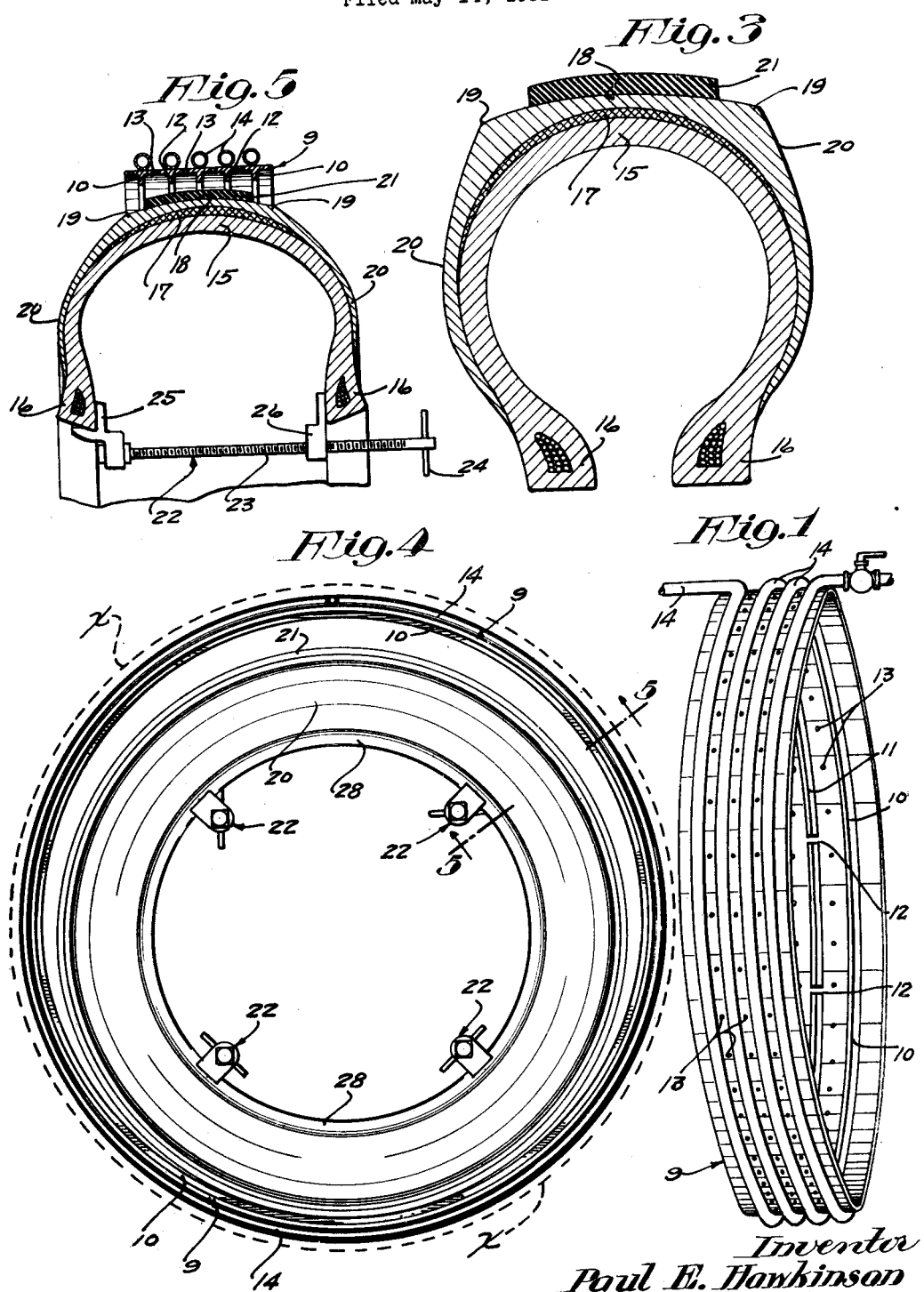

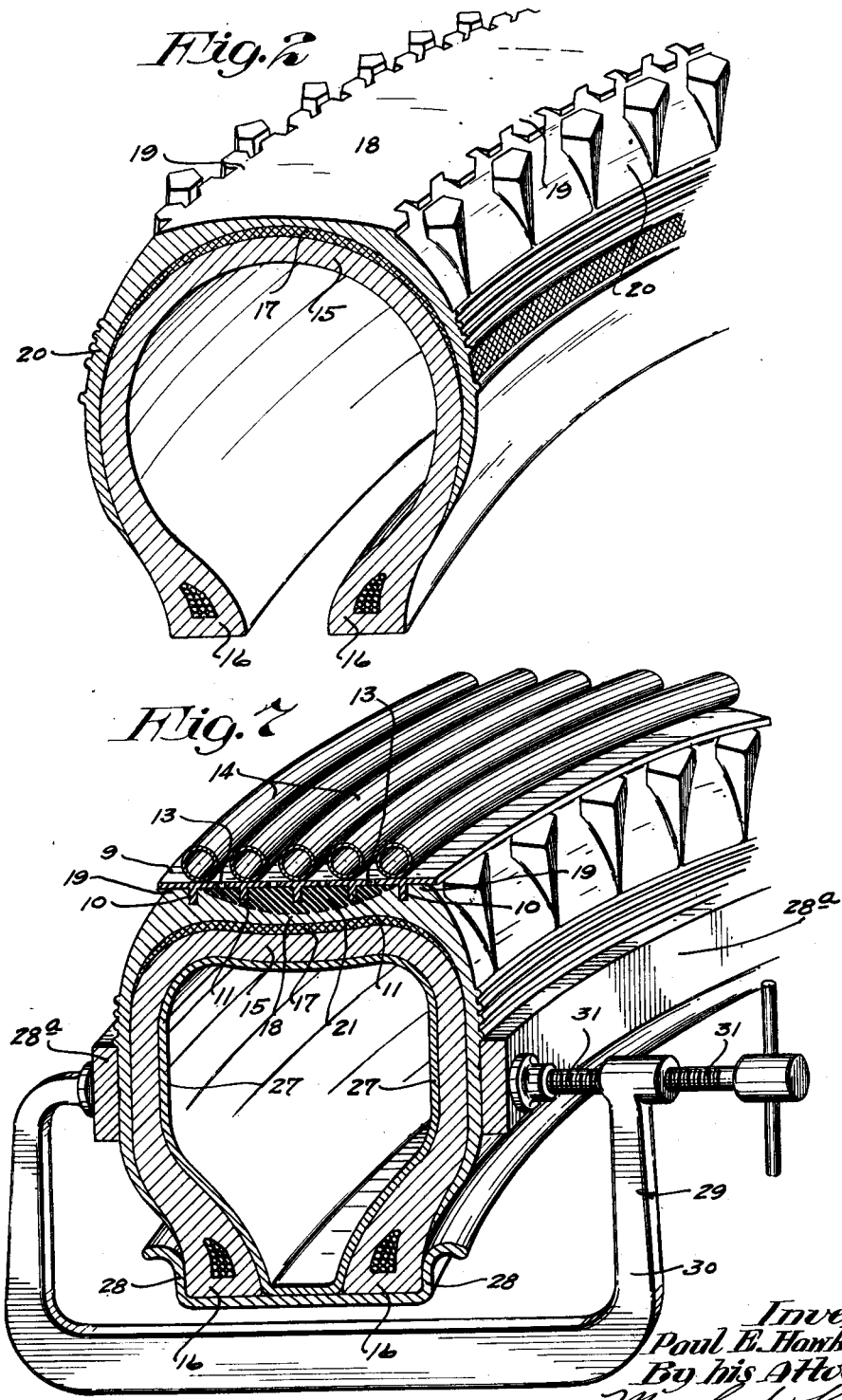

1,917,261

UNITED STATES PATENT OFFICE

PAUL E. HAWKINSON, OF MINNEAPOLIS, MINNESOTA, ASSIGNOR TO PAUL E. HAWKINSON COMPANY, OF MINNEAPOLIS, MINNESOTA, A CORPORATION OF MINNESOTA

METHOD OF RETREADING TIRE CASINGS

Application filed May 14, 1931. Serial No. 537,324.

My present invention relates to an improved method of retreading tire casings, such as used on motor vehicles, and further to an improved apparatus for use in carrying out the improved method.

An important object of the invention is to provide a simple and highly efficient method of applying new tread to the road engaging crown portions of tire casings to replace that which has been worn off or removed, without removing or materially changing the appearance of the original shoulder tread portions or side wall of the tire, thereby saving the original ornamental design of the tires, leaving them readily identifiable as to make, reducing to a minimum the labor required to prepare tires for and to perform a retreading operation and further materially reducing the amount of new material required.

Another important object of this invention is to provide a method whereby tire casings of varying sizes can be entered into and have new treads formed thereon in a single size annular matrix. Still another object of the invention is the provision of an extremely inexpensive but highly efficient apparatus for retreading tires.

Generally stated, the invention relates to a novel method, devices, combinations of devices and arrangement of parts hereinafter described and defined in the claims.

In the accompanying drawings, which illustrate the invention, like characters indicate like parts throughout the several views.

Referring to the drawings:

Fig. 1 is a perspective view of an improved matrix;

Fig. 2 is a fragmentary perspective view of a worn tire casing, before retreading;

Fig. 3 is a cross-sectional view of the casing after having a new but unformed crown tread applied thereto;

Fig. 4 is a view in side elevation illustrating the casing in a circumferentially contracted condition within the matrix;

Fig. 5 is a fragmentary sectional view taken on the line 5—5 of Fig. 4;

Fig. 6 is a fragmentary sectional view similar to Fig. 5 but illustrating the newly treaded casing circumferentially expanded against matrix and before application of vulcanizing heat;

Fig. 7 is a fragmentary sectional view similar to Fig. 6 but illustrating the retreaded casing as it appears in the matrix after vulcanizing;

Fig. 8 is a fragmentary perspective view of the casing removed from the matrix after completion of the retreading process; and Fig. 9 is a diagrammatic view illustrating the customary cord carcass construction of tire casings.

The improved matrix is comprised of a continuous, unbroken and non-separable annular section 9 that is substantially straight in axial cross-section and is provided near opposite edges of its inside surface with annular retaining ribs 10 and intermediate said retaining ribs with annular tread designforming ribs 11. This matrix is adapted for use with tire casings having a greater normal circumference than that of the inside of said matrix and the casings are entered thereinto in a manner hereinafter described. The annular retaining ribs 10 are continuous and unbroken but the tread-forming ribs 11 are formed of circumferentially aligned segments that are spaced apart slightly to form gates 12. Between the several ribs 10 and 11 the annular matrix member 9 is provided with numerous small air discharge passages 13.

The matrix may be heated in any desired manner but, preferably and as illustrated, this is accomplished by means of a steam coil 14 wound on the outer surface of the annular member 9, which member 9 is formed of quite light material and will be quickly and economically heated by said coil. This coil 14 may be connected to receive steam from any suitable source, not shown, through a delivery pipe 14$^a$ interposed in which is a control valve 14$^b$. Obviously, the coil 14 may be insulated against heat loss in any well-known manner.

The tire casing illustrated is of the character generally used on motor vehicles of the present day and comprises the customary cord carcass 15 having reinforced bead portions 16, a breaker strip 17, a rubber covering forming a road engaging crown tread portion 18, shoulder tread portions 19, and side wall protecting portions 20. The tire illustrated has a normal outside circumference greater than that of the inside of the matrix. This is best illustrated by the dotted circle X in Fig. 4, which illustrates the tire in a normally circumferentially expanded condition.

Fig. 2 illustrates a typical example of how an ordinary casing appears after having been run until its road engaging crown tread portion 18 has been worn thin and smooth. It should here be noted that while the center of the crown tread is very thin, the shoulder tread portions 19 on either side thereof and the side walls are in very good condition and render the casing readily identifiable to one familiar with the particular design on the shoulder tread and side walls.

The method of retreading worn tire casings, such as the one illustrated in Fig. 2, and the use of the matrix described will next be given. The first step in the method consists in applying new tread 21 to the worn crown of the tire substantially as shown in Fig. 3. This new tread is preferably in the form of unvulcanized rubber strip of slightly less width than the distance between the matrix retaining ribs 10, see particularly Fig. 5. The new tread rubber 21 may be applied in any suitable manner but is preferably cemented on the worn crown.

The next step in the method is to enter the casing into the matrix, which matrix has an inside circumference less than normal outside circumference of the casing. This is accomplished by laterally spreading the bead portions 16 of the casing and thereby circumferentially contracting the tread portion thereof to a less circumference than that of the inside of the matrix, and then placing the circumferentially contracted casing within the matrix as shown by full lines in Figs. 4 and 5.

Any suitable means for spreading the bead portions of the casing may be provided but as illustrated I provide spreading devices 22 applied at circumferentially spaced points. These spreading devices 22 each comprise a screw 23 having a hand-piece 24 at one end thereof, a head engaging lug 25 swiveled to the other end thereof and a nut-acting bead engaging lug 26 on the screw 23 intermediate the handle 24 and lug 25.

The next step in the method consists in releasing the casing from lateral spreading action, by removing the spreading devices 22, and thereby permitting the casing to expand circumferentially and bring its newly applied tread 21 into contact with the matrix treading forming ribs 11.

The next step consists in applying expanding pressure to the crown and shoulder portions of the casing to thereby press the newly applied crown tread tightly against the forming ribs 11 and the original shoulder tread portions, at each side of the newly applied tread, tightly against the confining ribs 10. This circumferential expanding action is preferably and can most conveniently be produced by placing the customary inner tube 27 in the casing, mounting the customary rim 28 and inflating the tire by applying fluid pressure within the tube in the ordinary manner. In order to insure positive contact between the shoulders and confining ribs 10 it is advisable to hold the casing against lateral expansion, under the action of fluid pressure, thereby increasing the circumferential expanding action of the shoulder portions thereof and for this purpose I provide a pair of annular members or rings $28^a$, which rings are applied in opposed relation one to each side wall of the casing, and suitable clampings 29, only one of which is here illustrated, arranged to press the rings $28^a$ toward one another. These clamps 29 each comprise a U-shaped body 30 and a clamping screw 31. The clamps are applied at circumferentially spaced points about the rings 38. Fig. 6 illustrates the complete assembly as it appears at the completion of this last described step in the method and by reference to said figure it will be noted that the tread forming ribs 11 have been partially pressed into the newly applied tread 21 and that the crown portion of the original casing tread is now held in a somewhat concave form.

The next step in the method consists in forming and vulcanizing the new tread and to this end the matrix is heated by passing steam through the matrix heating coil 14. Under this heat and continued circumferential expanding pressure of the casing the forming ribs 11 will completely enter the newly applied tread and the confining ribs 10 will enter the original shoulder tread portions of the casing substantially as illustrated in Fig. 7. During this step, of course, the newly applied tread will flow between the forming ribs 11, through gates 12, and thereby equalize pressure thereon. Pressure being greatest near the shoulders of the casing, due to the fact that the sides of the casing are held against lateral expansion, will cause the newly applied tread to flow away from the edges of the crown toward the center thereof and equalize expanding pressure of the casing on the new crown tread and said tread will be vulcanized in a substantially flat condition, as indicated in Fig. 7. The retaining ribs 10 positively confine the newly applied tread therebetween during the vulcanizing period and form continuous annular grooves 32 in the original shoulder tread portions 19 of the casing and the forming ribs 11 form broken grooves 33 in the newly applied crown tread.

Attention is here called to the fact that the combined action of heat and pressure, while sufficient to cause the retaining ribs 10 to enter the original shoulder tread, it will not be sufficient to cause the edge portions of the matrix that overlap the original shoulder tread to deface or alter the character of said shoulder tread. These edge portions of the matrix simply come to rest against the original shoulder tread and act as stops to limit entering movements of the retaining ribs 10 into the shoulder tread.

After the vulcanizing process has been completed, the tire may be deflated, the rings 28ª, tube 27 and rim 28 removed from the casing and the casing removed from the matrix. To remove the casing from the matrix, it is again laterally expanded by means of the spreading devices 22 and thereby circumferentially contracted sufficiently to withdraw its tread from the matrix ribs 10 and 11.

After removing the newly retreaded casing from the matrix and releasing the same from lateral spreading action, it will return to its normal shape and will appear substantially as illustrated in Fig. 8. This returning of the casing to its normal shape causes the newly applied crown tread, which was vulcanized in a cross-sectionally flat condition to round out and appear much like tread found on most new casings.

In practice it has been found that best results can be obtained from a retreaded casing if it is permitted to cool under pressure in the matrix. This practice can very economically be followed when my apparatus is employed because, first the matrix is light and will cool so rapidly that it will not greatly retard the speed of successive retreading operations and second, because extra equipment can be provided without great added expense. Also each size matrix will accommodate casings of varying dimensions and therefore a less number of different size matrixes are required than where mold equipment accommodating only one size tire is employed.

As illustrated diagrammatically in Fig. 9, tire casing carcasses are customarily made up of crossed cords 34 that extend from bead to bead of the casing on a diagonal to the axis thereof and these crossed cords 34 are adhered together by suitable quite soft rubber which permits considerable movement of the cords in respect to one another. It is this arrangement of the cords that is responsible for the circumferential contraction of the casing under lateral expanding pressure. By reference to Fig. 9, it will be apparent that under lateral spreading pressure the angles of the cords 34, in respect to the axis of the casing, will be decreased with the result that the casing will actually stretch laterally and contract circumferentially. It is, of course, this action of the cords that gives flexibility to tire casings.

Attention is here called to the fact that treads applied to casings, which are in a circumferentially contracted cross-sectionally flattened condition, will stretch and be maintained under tension when the casing is returned to a normal condition and that this tendency of the tread to return to a cross-sectionally flattened, circumferentially contracted condition renders the casing more easily flexed as it rolls over a road and therefore reduces road resistance to a minimum.

From the foregoing it will be obvious that while the invention is particularly described for use in treating casings having worn-off or otherwise reduced crown tread portions, it will be readily appreciated by those skilled in the art that the method and apparatus is equally adapted, without modification, for the application of tread material to the crown portion of tires having less than the desired thickness or formation of tread.

The apparatus for retreading tire casings herein shown and described is broadly claimed in my co-pending application Serial No. 648,132, filed December 20, 1932.

What I claim is:

1. The method of treading tire casings, which comprises spreading the side walls of the casing laterally at circumferentially spaced points to circumferentially contract the crown portion of the casing, then placing the circumferentially contracted casing within a matrix having an inside circumference less than that of the normal circumference of the casing, permitting expansion of the casing against the matrix by relieving the same from lateral spreading action, applying circumferential expanding pressure to the casing to expand the same under pressure against the matrix, and applying heat to the matrix.

2. The method of treading tire casings, which comprises applying tread material to the crown of the casing, in laterally spreading the side walls of the casing at circumferentially spaced points to circumferentially contract the crown portion of the casing, in placing the circumferentially contracted casing within a surrounding matrix having an internal diameter less than the normal diameter of the casing, in diametrically expanding the casing against the surrounding matrix, and in applying heat to the matrix to cure the applied crown tread material on to the crown of the casing.

3. The method of treading tire casings, which comprises applying tread material to the crown of the casing, in laterally spreading the side walls of the casing at circumferentially spaced points to circumferentially contract the crown portion of the casing, in placing the circumferentially contracted casing with its applied tread material within a surrounding matrix having an internal diameter less than the normal diameter of the treaded casing, in circumferentially expanding the casing against the surrounding matrix to bring the shoulders of the casing into sealing contact with the opposite side portions of the cylindrical mold, whereby to confine the tread material therebetween, and applying heat to the matrix to cure the confined crown tread material to the crown of the casing.

4. The method of treading tire casings, which comprises applying tread material to the crown of the casing, in laterally spreading the side walls of the casing at circumferentially spaced points to circumferentially contract the crown portion of the casing, in placing the circumferentially contracted casing with its applied tread material within a surrounding matrix having an internal diameter less than the normal diameter of the treaded casing, in circumferentially expanding the casing against the surrounding matrix to bring the shoulders of the casing into sealing contact with the opposite side portions of the cylindrical mold, whereby to confine the tread material therebetween, and applying heat to the matrix to cure the confined crown tread material to the crown of the casing, cooling the cured tread while under such expanded condition within the matrix, in relieving the casing from circumferential expanding pressure and thereafter laterally spreading the side walls of the casing at circumferentially spaced points to circumferentially contract the crown portion of the casing to free the tire from the surrounding matrix.

5. The method of treading tire casings, which comprises applying tread material to the crown of the casing, in laterally spreading the side walls of the casing at circumferentially spaced points to circumferentially contract the crown portion of the casing, in placing the circumferentially contracted casing with its applied tread material within a surrounding matrix having an internal circumference less than the normal circumference of the casing, in permitting expansion of the casing by relieving the same from lateral spreading action, in forcing the casing against the matrix by applying expanding pressure within the same while holding the side walls of the casing against spreading action, but leaving the shoulder portions of the casing outward of the matrix free for radial expanding action.

6. The method of treading tire casings, which comprises applying a tread material to the crown of the casing intermediate the shoulders thereof, in placing the casing within and permitting expansion of the same against an annular matrix that engages only the newly applied crown tread and adjacent shoulders of the casing, whereby to confine the newly applied tread material between the shoulders when under pressure and in a flowing condition, in applying internal expanding pressure to the casing to expand the same against the matrix, and applying heat to the matrix.

7. The method of treating tire casings having moldable tread material at the crown of the casing and intermediate the shoulders thereof, in placing the casing within and expanding the crown portion to compress the moldable tread portion against an annular matrix, applying heat to the matrix to mold and cure the tread material, and finally removing the casing from within the matrix by laterally spreading the side walls of the casing at circumferentially spaced points to circumferentially contract the crown portion thereof out of engagement with the mold.

8. The method of treading tire casings, which comprises applying tread material to the crown of the casing, in deforming the casing throughout its circumference so that the crown portion of the carcass and the applied crown tread material are in a cross-sectionally substantially flat condition, and in curing the newly applied tread material to the crown of the casing while the casing is in the circumferentially deformed condition.

In testimony whereof I affix my signature.

PAUL E. HAWKINSON.

ing contact with the opposite side portions of the cylindrical mold, whereby to confine the tread material therebetween, and applying heat to the matrix to cure the confined crown tread material to the crown of the casing.

4. The method of treading tire casings, which comprises applying tread material to the crown of the casing, in laterally spreading the side walls of the casing at circumferentially spaced points to circumferentially contract the crown portion of the casing, in placing the circumferentially contracted casing with its applied tread material within a surrounding matrix having an internal diameter less than the normal diameter of the treaded casing, in circumferentially expanding the casing against the surrounding matrix to bring the shoulders of the casing into sealing contact with the opposite side portions of the cylindrical mold, whereby to confine the tread material therebetween, and applying heat to the matrix to cure the confined crown tread material to the crown of the casing, cooling the cured tread while under such expanded condition within the matrix, in relieving the casing from circumferential expanding pressure and thereafter laterally spreading the side walls of the casing at circumferentially spaced points to circumferentially contract the crown portion of the casing to free the tire from the surrounding matrix.

5. The method of treading tire casings, which comprises applying tread material to the crown of the casing, in laterally spreading the side walls of the casing at circumferentially spaced points to circumferentially contract the crown portion of the casing, in placing the circumferentially contracted casing with its applied tread material within a surrounding matrix having an internal circumference less than the normal circumference of the casing, in permitting expansion of the casing by relieving the same from lateral spreading action, in forcing the casing against the matrix by applying expanding pressure within the same while holding the side walls of the casing against spreading action, but leaving the shoulder portions of the casing outward of the matrix free for radial expanding action.

6. The method of treading tire casings, which comprises applying a tread material to the crown of the casing intermediate the shoulders thereof, in placing the casing within and permitting expansion of the same against an annular matrix that engages only the newly applied crown tread and adjacent shoulders of the casing, whereby to confine the newly applied tread material between the shoulders when under pressure and in a flowing condition, in applying internal expanding pressure to the casing to expand the same against the matrix, and applying heat to the matrix.

7. The method of treating tire casings having moldable tread material at the crown of the casing and intermediate the shoulders thereof, in placing the casing within and expanding the crown portion to compress the moldable tread portion against an annular matrix, applying heat to the matrix to mold and cure the tread material, and finally removing the casing from within the matrix by laterally spreading the side walls of the casing at circumferentially spaced points to circumferentially contract the crown portion thereof out of engagement with the mold.

8. The method of treading tire casings, which comprises applying tread material to the crown of the casing, in deforming the casing throughout its circumference so that the crown portion of the carcass and the applied crown tread material are in a cross-sectionally substantially flat condition, and in curing the newly applied tread material to the crown of the casing while the casing is in the circumferentially deformed condition.

In testimony whereof I affix my signature.

PAUL E. HAWKINSON.

DISCLAIMER 1,917,261.—*Paul E. Hawkinson*, Minneapolis, Minn. METHOD OF RETREADING TIRE CASINGS. Patent dated July 11, 1933. Disclaimer filed June 20, 1941, by the assignee, *Paul E. Hawkinson Company*.

Hereby enters this disclaimer of claim 6 of said patent.

[*Official Gazette July 15, 1941.*]

DISCLAIMER 1,917,261.—*Paul E. Hawkinson*, Minneapolis, Minn. METHOD OF RETREADING TIRE CASINGS. Patent dated July 11, 1933. Disclaimer filed June 20, 1941, by the assignee, *Paul E. Hawkinson Company*.

Hereby enters this disclaimer of claim 6 of said patent.

[*Official Gazette July 15, 1941.*]